United States Patent
Brifman et al.

(10) Patent No.: US 11,394,415 B2
(45) Date of Patent: Jul. 19, 2022

(54) SYSTEM AND METHOD FOR ACHIEVING A CLEAN SEPARATION OF SIGNAL AND NOISE

(71) Applicants: Joseph Brifman, Palm Coast, FL (US); Sergey Rassomakhin, Kharkov (UA); Vladimir Shlokin, Kharkov (UA)

(72) Inventors: Joseph Brifman, Palm Coast, FL (US); Sergey Rassomakhin, Kharkov (UA); Vladimir Shlokin, Kharkov (UA)

(*) Notice: Subject to any disclaimer, the term of this patent is extended or adjusted under 35 U.S.C. 154(b) by 0 days.

(21) Appl. No.: 17/238,999

(22) Filed: Apr. 23, 2021

(65) Prior Publication Data
US 2021/0336645 A1 Oct. 28, 2021

Related U.S. Application Data

(60) Provisional application No. 63/016,563, filed on Apr. 28, 2020.

(51) Int. Cl.
*H04B 1/12* (2006.01)
*H04B 17/10* (2015.01)

(52) U.S. Cl.
CPC ........... *H04B 1/123* (2013.01); *H04B 17/104* (2015.01)

(58) Field of Classification Search
CPC .......... H04B 1/123; H04B 1/401; H04B 7/08; H04B 7/10; H04B 7/15; H04B 7/413; H04B 17/10; H04B 17/12; H04B 17/102; H04B 17/104
See application file for complete search history.

(56) References Cited

U.S. PATENT DOCUMENTS

| | | | |
|---|---|---|---|
| 8,649,418 B1 * | 2/2014 | Negus ................ | H04B 7/15592 375/211 |
| 2021/0314201 A1 * | 10/2021 | Nikitin .................... | H03M 5/02 |
| 2022/0068252 A1 * | 3/2022 | Seagriff ............. | G10K 11/1785 |

* cited by examiner

*Primary Examiner* — Thanh C Le
(74) *Attorney, Agent, or Firm* — Brennan, Manna & Diamond, LLC

(57) ABSTRACT

A system for achieving a clean separation of signal and noise. The system comprises a plurality of electronic filters and specially designed radio transmitters and receivers. The system is configured to monitor a signal source for various parameters. The system observes the operating noise and the after-effect of the previous discrete signal. The system utilizes linear algebra equations to filter signals by frequency, shape, duration, or time position in order to more effectively separate the signal from noise, by forgoing the theoretical principle of maximum likelihood.

20 Claims, 8 Drawing Sheets

SYSTEM AND METHOD FOR ACHIEVING A CLEAN SEPARATION OF SIGNAL AND NOISE

CROSS-REFERENCE TO RELATED APPLICATION

The present application claims priority to, and the benefit of, U.S. Provisional Application No. 63/016,563, which was filed on Apr. 28, 2020 and is incorporated herein by reference in its entirety.

BACKGROUND

The present invention generally relates to a system for improving the transmission of information, and more specifically to a system for achieving a clean separation of signal and noise. Accordingly, the present specification makes specific reference thereto. However, it is to be appreciated that aspects of the present invention are also equally amenable to other like applications, devices, and methods of manufacture.

The main problem for fast and reliable transmission of information over real wired and radio channels is the presence of interference or noise. The nature of the interference occurrence is subject to many variables. However, such noise is always present and interferes with the transmission of information. The achievable speed of absolutely error-free transmission in an idealized channel without interference has no limits and is determined only by the performance of the information source. Unfortunately, due to noise occurrences, existing communication systems are much slower, and errors are observed at the output of data receivers. Therefore, a system that can filter signals by frequency, shape, duration, or time position in order to more effectively separate the signal from noise is desired.

The prevailing theory of information transfer is based on erroneous cost principles. This theory developed many years after the advent of program work. It is based on the simplest and therefore, easily accepted by all the principle of maximum likelihood or maximum "similarity". This principle is implemented in a variety of mutually similar ways in detecting and distinguishing elementary signals such as information carriers and decoding noise-resistant codes designed to correct errors in discrete messages. The principle of maximum likelihood is the basis of absolutely all existing data transfer protocols and any information transfer systems.

The problem of overcoming the technological impasse of the theory of information transmission is that, unfortunately, no one doubts the validity of the "maximum likelihood". This principle is a natural result of a person's physiological experience: in this way we try to hear something in the presence of disturbing noise or to discern in conditions of poor visibility by comparing sounds or images with known samples or examples. However, this generalization of human experience to technical systems has directed the development of information theory in the wrong way. As a result, a theory based on the so-called "Capacity" of any physical information transmission channel currently dominates.

This theory is the reason for the canonization of the "fundamental limits" of the energy and frequency efficiency of information transmission systems, and the maximum achievable speed and reliability of information transmission is uniquely determined by the signal-to-noise ratio and the channel bandwidth. In accordance with the basic tenet of information theory, the capacity C (the maximum possible speed of reliable information transmission) for a channel with a gaussian noise having a flat spectrum in an arbitrarily wide frequency band is determined by the expression:

$$C = F \cdot \log_2\left(1 + \frac{P_S}{P_N}\right),\qquad \text{Equation (1)}$$

where F is the frequency bandwidth of the channel; $P_S$, $P_N$ are signal and noise power, respectively. Under this formula, capacity is the boundary data transfer rate, which cannot be exceeded by arbitrarily high transmission reliability. Existing methods of encoding and decoding, allow us to approach arbitrarily closely to this boundary, but not to exceed it in any way.

From this formula follows the extensive, extremely costly nature of the evolution of technical telecommunication systems. Essentially, to transmit faster and without errors in the conditions of inevitable interference requires either increasing the transmitter power or expanding the necessary frequency band. 5G technology is the natural result of formula (1). To increase the speed of information transfer, this technology involves a huge expansion of the band of frequencies used for signal placement, such as from 20 to 100 GHz. Radiations at such frequencies are extremely dangerous for living organisms, in addition, the entire limit presented to us by nature for radio communications is exhausted.

Thus, within the existing theory, practical communication technologies have reached a dead end: all suitable radio frequency range is already exhausted by 5G communicators, and the increase of power of emitters is practically not feasible. At the same time, the requirements for volumes and speeds of information transfer increase extremely quickly.

A possible way to increase the transmission rate could be the use of super-informative (multi-level) signals, where a large amount of information is transmitted using one signal. However, in presence of noise, the distinguishability of levels of such signals decreases, and a huge increase in transmitter power is required, which is impossible. A stream of inadvertent errors makes this connection useless. Therefore, now all ITS use only PSK (Phase Shift Key) or QPSK (Quadrature Phase Shift Key) signals that have two or at most four distinguishable levels. Error correction codes demonstrate low efficiency and are almost never used in data transmission systems in which reception errors are unacceptable. Thus, in an overcrowded electromagnetic environment, the only way to get out of the information deadlock is to overcome the effect of noise, which is always present in the channels.

Accordingly, there is a great need for a significant reduction of the required transmitter power while maintaining reliability and other communication quality indicators. There is also a need for a way for an essential increase in the data transfer rate while maintaining the existing frequency-energy balance of the channels. Similarly, there is a need for a way to reorganizing multi-channel communication and multiple access systems. There is also a need for a way to improve secrecy and security of data transmission. Further, there is a need for a way to increase the reliability and speed of data transfer between remote objects under natural and deliberate interference.

In this manner, the improved transmission system of the present invention accomplishes all of the forgoing objectives, thereby providing a solution for improving the characteristics of information transmission systems in terms of specific energy and frequency efficiency several hundred and thousand times. A primary feature of the present invention is to eliminate the dependence of communication reliability on the signal-to-noise ratio in channels with noise. The present invention applies a new procedure for sterile separation of signals from noise. The present invention eliminates the influence of a limited frequency channel bandwidth on the speed of absolutely reliable data transmission. Finally, the improved system of the present invention is capable of providing the absolutely accurate separation of signals and noise.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a system for achieving clean separation of signal and noise utilizing linear algebra to establish the sterile separation of signals. Use of discrete measurements of a mixture of signal and noise enables the composition and solution of ordinary systems of linear algebraic equations (SLAE). The primary tool for such separation is the matrix of coefficients for unknowns of the task. These matrices consist of two parts: the signal part, in which placed sets of discrete measurements of a known basic signal's waveform or waveforms of several signals received simultaneously (taking into account deterministic distortion of the receiving path); and the noise part, which contains the coefficients of the selected basis for the decomposition of noise.

As a result of the solution of a correctly compiled SLAE, a purified form of the value of the informative parameter of the signal, as well as an exact copy of the noise process, is achieved. In this case, another signal or a plurality of signals and noise existing in the same physical resource of the channel may act as noise. Reprocessing using the same algorithm accurately recovers background signals, and the like.

Correctly synthesized matrix of coefficient SLAE is hereinafter termed "Linear Separation Matrix" (LSM). The matrix SLAE is an LSM, if it leads to a correct algebraic system and extracts the true value of the informative parameter of the signal. Moreover, the rank of LSM is equal to the rank of its extended matrix when combined with the column vector of the right-hand side of the SLAE. The SLAE based on the correct LSM always has the solution, because its rank coincides with the number of unknown variables. This ensures sterile separation of the signal from noise. The required variables of the task are the informative parameters of the received signals and the coefficients for the basic functions of the noise decomposition in time scale.

One of the basic conditions for obtaining a correct certain system of equations on the basis LSM is the main property of digital data transmission channels. Even with theoretically infinite channel memory (in conditions of a sufficiently limited frequency band), the reaction of the channel's output to the next signal cannot begin earlier than this signal will go to its input.

A primary function of the present system can be described as follows. A receiver observes the channel output for some time before the appearance of the desired signal or after its occurrence, when the next signal may already appear. It is possible to observe not only the operating noise, but also the after effect of the previous discrete signal, which does not hinder correct composition and solution of the reception equations. The presence of a time interval corresponding to the absence of the expected signal makes it possible to obtain the coefficient of LSM with completely linearly independent rows and columns. This provides a sufficiently good system certainty and enables reliable reception of signals even at extremely low signal/noise ratios.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
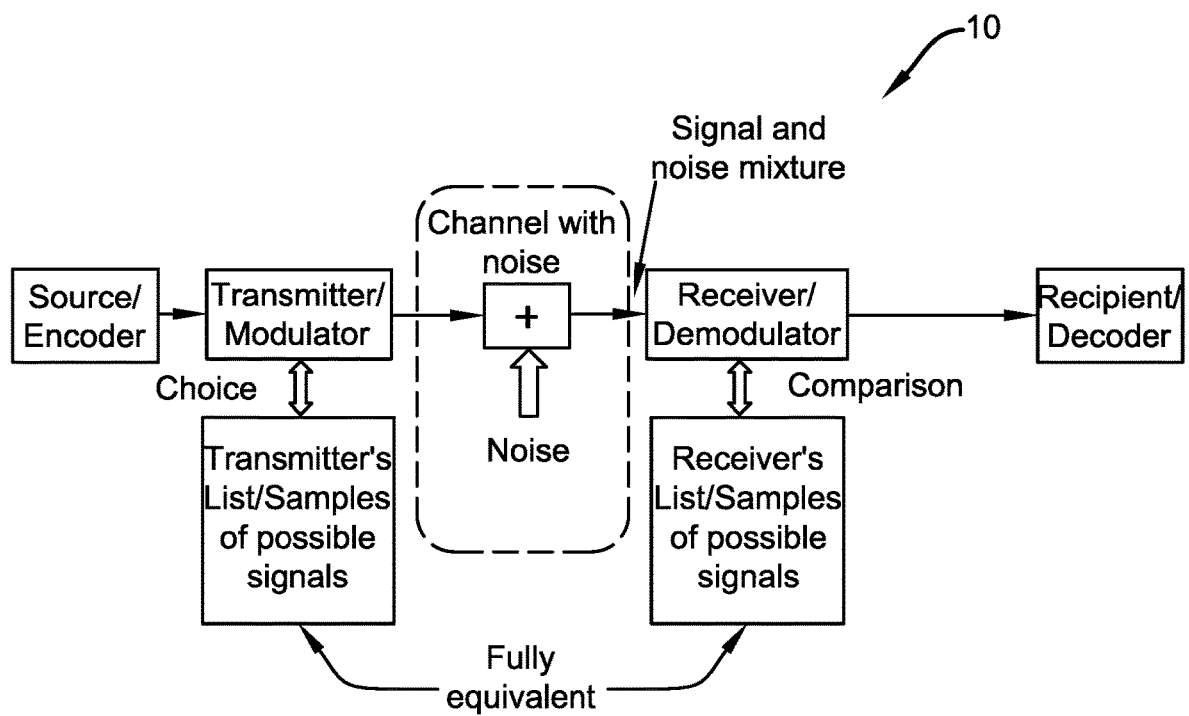
FIG. 1 illustrates an illustrative embodiment of an information transmission system in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

The root cause of the effectiveness limiting of existing telecommunication technologies is the method of receiving signals in the presence of interference. This method, called the "maximum likelihood principle", is based on a probabilistic assessment of the real transmitted signal after signal and noise mixture observing. As demonstrated in a system 10 illustrated in FIG. 1, this assessment is performed at an input of a demodulator. It is assumed that the bandwidth of the noise spectrum is exactly the same as the bandwidth of the signal. In all existing systems, a Receiver/Demodulator is forced to make decisions based on the observation of "dirty" samples under the conditions of noise, not eliminated from the mixture. The task of the receiver, when it receives the recurrent signal, is to decide which of the signal forms from this list it observes at the channel output at the current moment of time. This is performed by comparing the degree of similarity of the observed noisy signal form with the standards from the receiver's list (maximum likelihood rule). The most similar standard is considered the received signal. Any of the known methods can be used to assess the degree of similarity.

Figure 2:
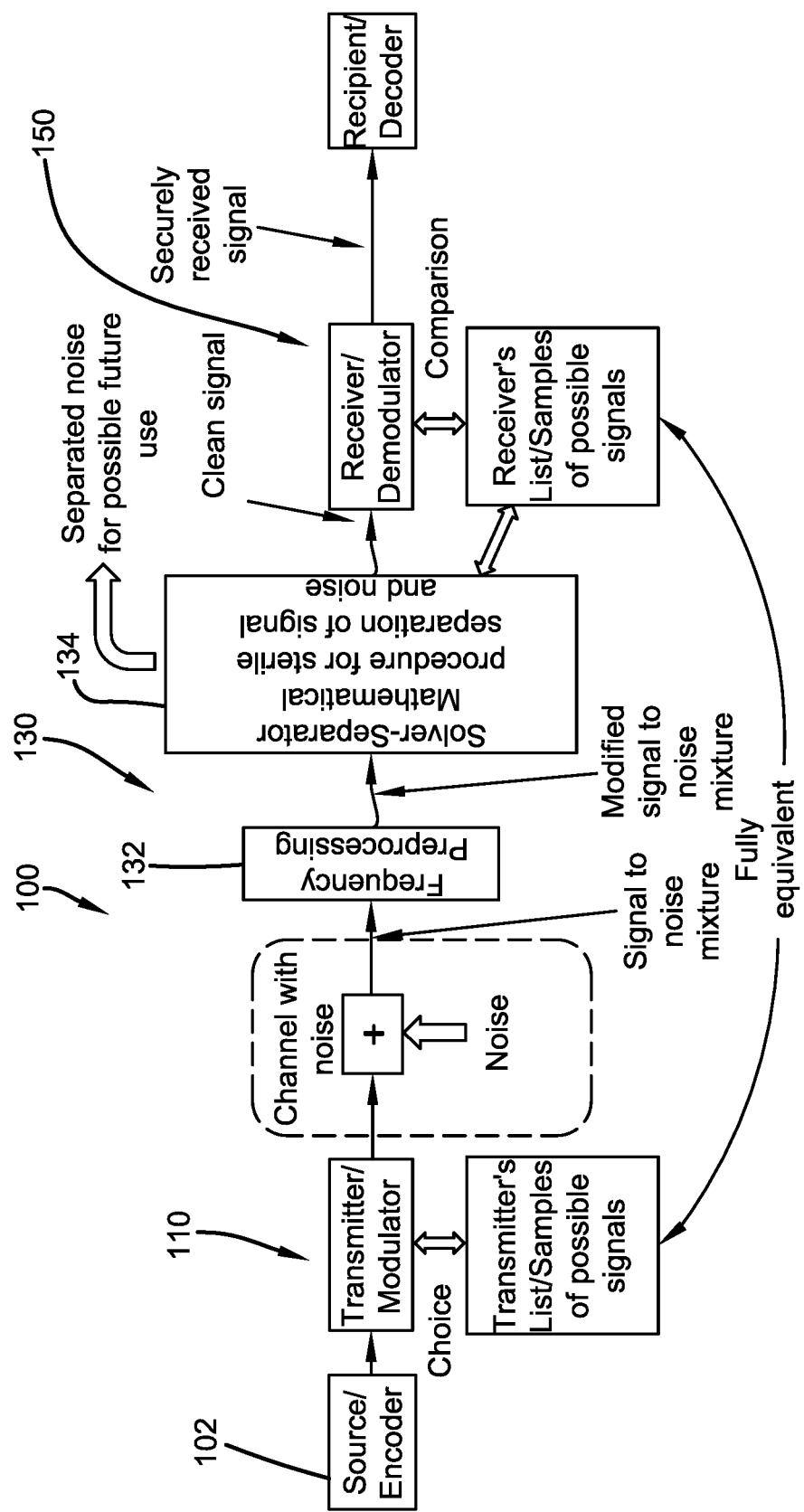
FIG. 2 illustrates an illustrative embodiment of an information transmission system for achieving clean separation of signal and noise of the present invention in accordance with the disclosed architecture.

The present invention as illustrated in FIG. 2 comprises a system 100 configured to completely eliminate noise at an input of a Receiver/Demodulator before it has to make a decision. This is equivalent to receiving on output interference-free channel. As the Capacity of such channels is infinite, the speed of information transfer can be arbitrarily high, and the reliability of decision-making by the Receiver/Demodulator can be absolute.

The key step is to abandon the standard maximum likelihood rule, which is now used for probabilistic guessing of true signal levels. The developed mathematical separation method is applicable to any noise, the realizations of which can be decomposed in an arbitrary orthogonal basis. This kind of noise includes all types of interference in channels and communication lines of any physical nature: radio channels with global propagation of radio waves for communication with ground, surface (above-water), underwater, aerial, and other objects; low-cost line-of-sight radio channels in satellite systems, in space communications, mobile networks, and in the Internet of things (IoT); and channels with a guiding medium in the form of metal conductors (wire channels) and wave-propagating systems, etc.

It is fundamentally important that the branch of new technologies even copes with the task of separating signals from the most unfavorable type of noise, additive white Gaussian noise with an infinite (unlimited in frequency band) spectrum. This is now considered impossible within the framework of terms accepted in information theory. In addition, the developed technology can be further used in radars to improve the accuracy of direction finding and object recognition.

The system 100 comprises a plurality of electronic filters 130 and specially designed radio transmitters 110 and receivers 150. The plurality of electronic filters 130 comprise a frequency preprocessing component 132 and a solver-separator component 134 in communication with the frequency preprocessing component. The frequency preprocessing component 132 is configured to accept a signal to noise mixture from the transmitter/modulator 110 via a channel with noise and send a modified signal to noise mixture to the solver-separator component 134 for completing the clean separation of signal and noise.

The system 100 is configured to monitor a signal source 102 for various parameters. The system 100 observes the operating noise and the after-effect of the previous discrete signal. The system 100 utilizes linear algebra equations to filter signals by frequency, shape, duration, or time position in order to more effectively separate the signal from noise, by forgoing the theoretical principle of maximum likelihood.

For an approximate comparison, the proposed sterile signal separation technology provides an equivalent capacity, estimated by the expression:

$$C' = F \cdot \log\left(1 + \frac{P_S}{\delta \cdot N_0 \cdot F}\right), \qquad \text{Equation (2)}$$

$$C' \gg C,$$

where $\delta \approx 0$—arbitrarily small value. The difference of $\delta$ from the null is determined only by the final indicators of the accuracy of discrete measurements of the signal-noise mixture at the input of the receivers and by rounding-off errors when performing special calculations. The payment for the achieved effect is the increased requirements for the accuracy of analog-to-digital converters (ADC—Analog to Digit Converters) and the accuracy of synchronization in the ITS. These are purely technical difficulties that already have definite solutions.

Existing communications systems use two specific indicators: energy ($\beta$) and frequency ($\gamma$) efficiency to describe the specific rate of information transfer. The specific energy efficiency indicator is defined as:

$$\beta = \frac{R}{E_b/N_0} = R \cdot \alpha^{-1} \,[\text{Bit}], \qquad \text{Equation (3)}$$

where R—transmission speed; $E_b$—energy needed to transmit one bit of information; $N_0$—spectral density of power of the additive white gaussian noise in a channel;

$$\alpha = \frac{E_b}{N_0}$$

—signal-to-noise ratio in a channel, reduced to one bit at the required error probability per symbol $P_0$. The indicator is usually calculated under the assumption that the entropy per symbol of the initial text H(x)=log m bit/symbol (m—power of an alphabet source). If m=2 then H(x)=1 bit/symbol. For sufficiently small probability values $P_0$ it uses the definition $\beta \approx 1/(E_b/N_0) = \alpha^{-1}$.

To assess the frequency efficiency of communication protocols, an indicator is typically used:

$$\gamma = \frac{R}{F} = \frac{\log m}{F} [\text{bit} \cdot s^{-1}/\text{Hz}], \quad \text{Equation (4)}$$

where F is the channel's frequency band. For the binary case with $P_0 \ll 1$ we suppose $\gamma \approx 1/F$. The value shows the number of bits transmitted by a signal (code) in one Hz of the channel frequency band per one second.

The indicators are characterized by objectivity and simplicity and are used to describe the specific rate of information transfer. Compared by these indicators, the systems are put in the same conditions. Therefore, indicators β and γ are a convenient and objective tool for comparing systems.

In the existing information transmission theory, the Capacity of the Gaussian channel of equation (1) determines the limit of physically achievable rates. Therefore, it is generally accepted definition of dependence of limiting exchange between indicators of energy and frequency efficiency. This exchange is defined by the equation R=C. Using the definitions together:

$$\beta = \frac{\gamma}{2^\gamma - 1}. \quad \text{Equation (5)}$$

Figure 3:
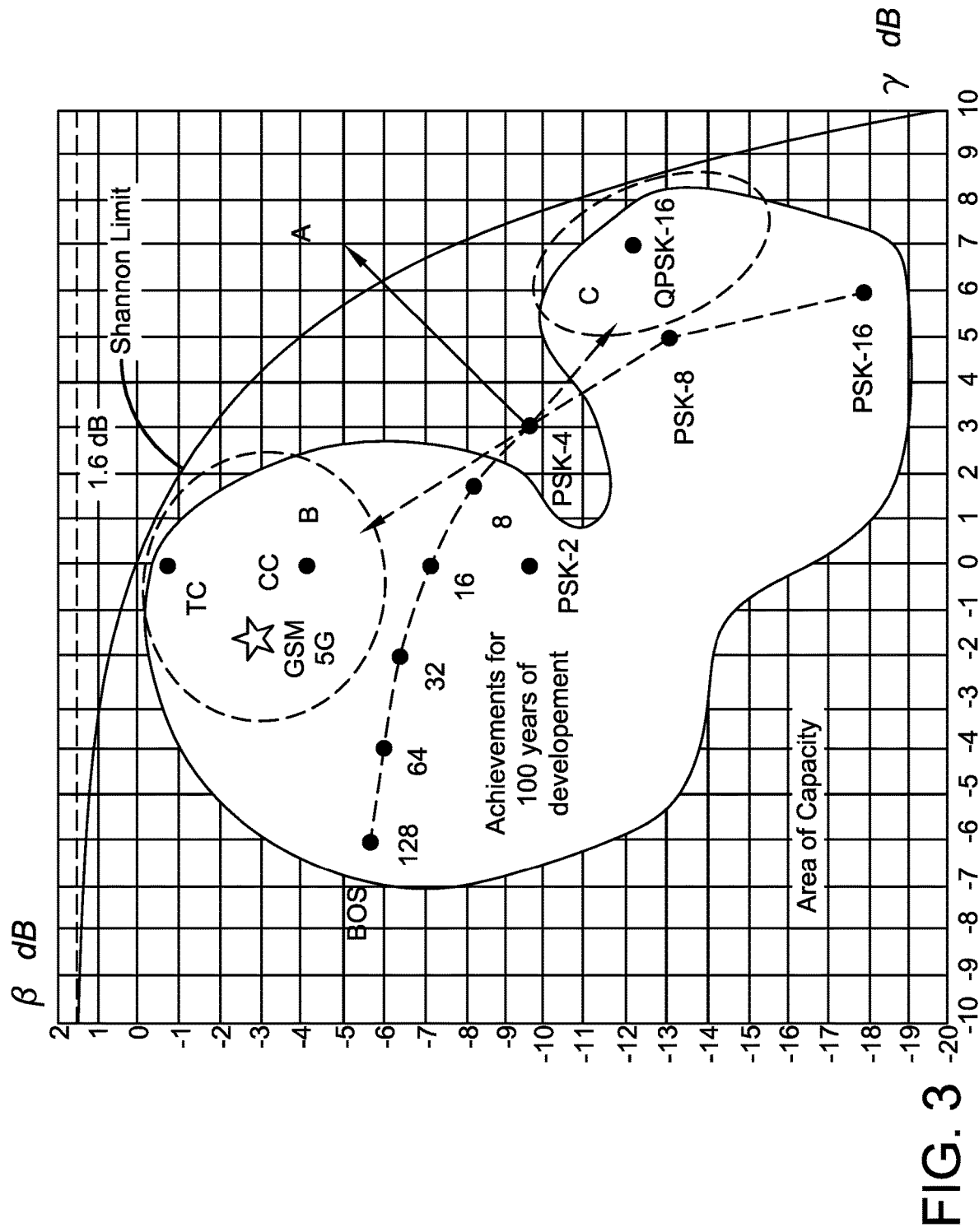
FIG. 3 illustrates a graph of an efficiency plane in logarithmic coordinates for an information transmission system in accordance with the disclosed architecture.

The boundary is usually depicted on the efficiency plane in the form of the so-called "Shannon limit" which bounds a certain region. The existing theory approves that the displaying points of real systems can be only in this area. The efficiency plane in logarithmic coordinates (decibels) is shown in FIG. 3. Area matching condition R<C (area of capacity) is bounded in the figure by the "Shannon limit" indicated as a curve. For the indicator β, in accordance with definition (3), the range from −∞ to 1.6 dB is acceptable. On the efficiency plane, in the capacity area, points with coordinates which correspond to the best and known typical modulation and coding systems are shown.

The central place in the figure is occupied by quadrature phase modulation (PSK-4). The binary phase modulation (PSK-2) is inferior to PSK-4 by 3 dB in terms of frequency efficiency. To the right and lower of the PSK-4 are systems with a large number of phase manipulation angles (PSK-8, PSK-16, etc.). To the left and above are points corresponding to biorthogonal signals (BOS) with corresponding ensemble powers. The PSK and BOS points are located on the same curve, almost parallel to the Shannon limit. In area "B", the CC point corresponds to cascading code. The TC point corresponds to the turbo code when using eighteen iterations of improvement of the sequentially developed solution. By symbol ★ in FIG. 3, shown point, which correspond to the most widely used GSM mobile communication protocol and actively implemented 5G. Point QPSK-16 in the area "C" correspond quadrature amplitude-phase modulation using 16 different signal position in the amplitude-phase plane along with convolutional code.

The best direction of movement on the plane of efficiency, if we consider PSK-4 as a starting point is the direction indicated by the arrow "A". Moving a point at an angle of 45° delivers the same increment in indicators of frequency and energy efficiency. Unfortunately, for existing systems, such optimization is not feasible as none of the existing systems exceeds PSK-4 simultaneously for both specific indicators. There are only two degrees of freedom for optimizing technical solutions on the efficiency plane: frequency and energy. Thus, decreasing energy costs (increasing β) requires increasing frequency costs (decreasing γ) and vice versa. All the available results are just two small steps to the side: step to the left (region "B" due to the application of noise-resistant codes) and step to the right (region "C" due to an increase in the power of the channel alphabet) instead of moving towards the desired target in the direction "A".

The input basis of existing communication technologies with the limitations noted above is the so-called "maximum likelihood rule", which is using for decision making in signal and noise mixture conditions. Its essence lies in the probabilistic assessment of the received noisy signal. The assessment corresponds to the maximum similarity to any of the variants of signals, known to the receiver. True transmitted is considered one of the possible signals that is most similar to the output signal of the channel with noise. As a measure of similarity, the distance of the Euclidian or Gilbert correlation proximity is used for signals, and the Hamming distance is used for noise-resistant codes.

Figure 4:
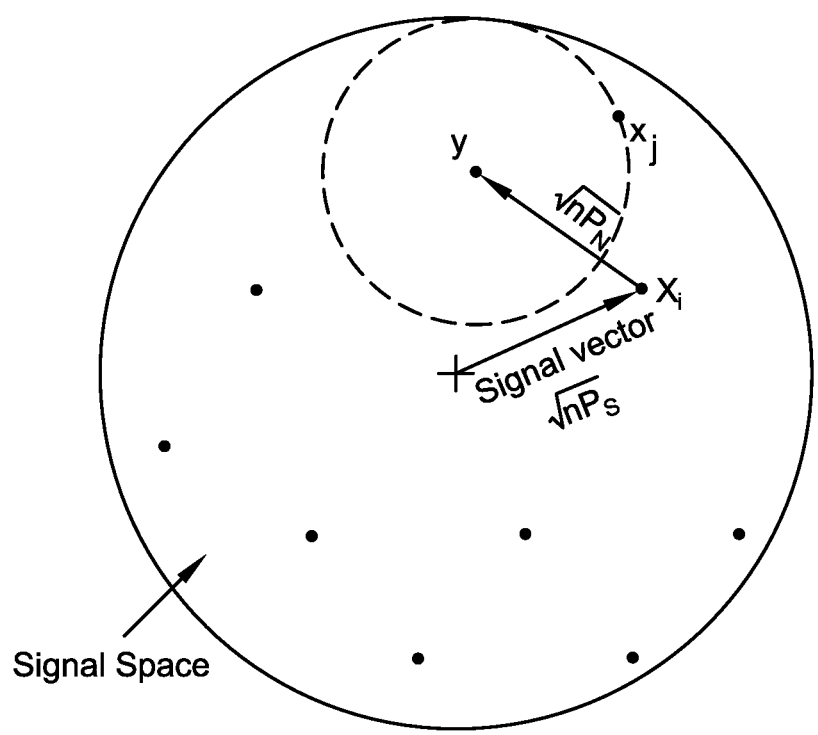
FIG. 4 illustrates an illustration of signal space with additive noise in accordance with the disclosed architecture.
Figure 5:
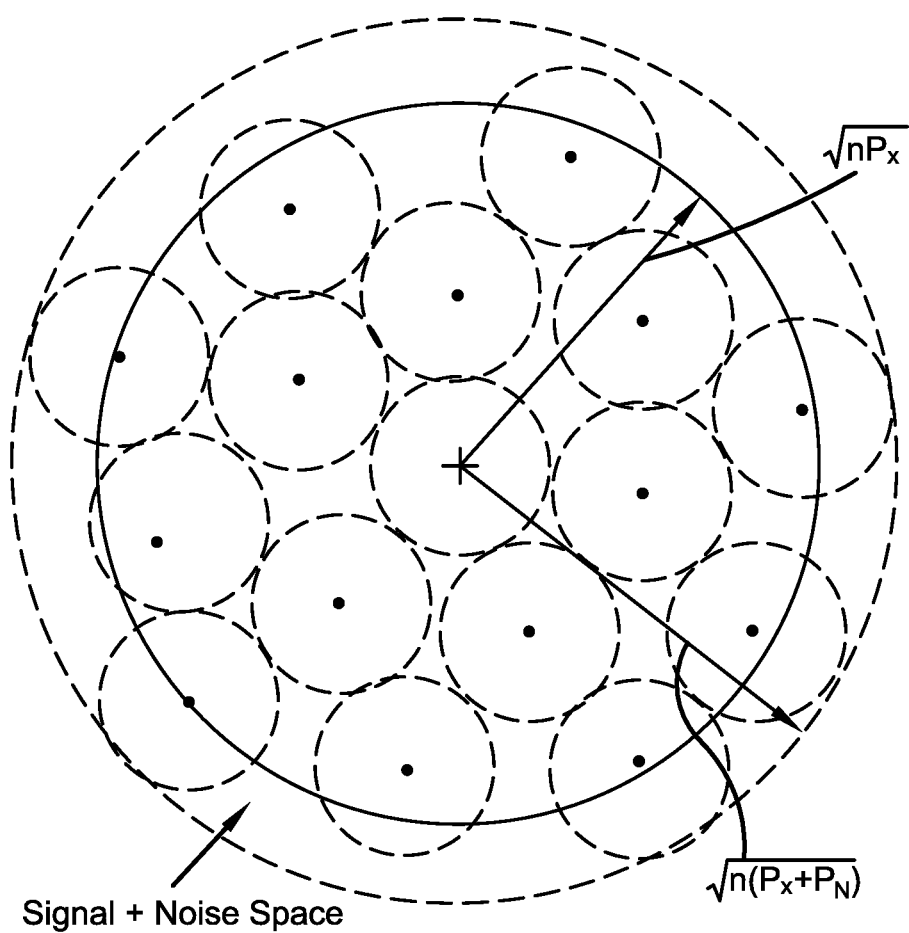
FIG. 5 illustrates an illustration of capacity definition in accordance with the disclosed architecture.

The axiomatic maximum likelihood rule using for signal and noise mixture conditions is the reason for the appearance of a category called Channel Capacity. This is illustrated in FIGS. 4 and 5 using Shannon's geometric representations. FIG. 4 provides an illustration of signal space with additive noise. In the space of signals, for example, the vector "Signal vector" shown in the picture corresponds to the transmitted signal $x_i$. Its length is calculated as $\sqrt{nP_S}$, where n is the dimension of signal space, n=2FT; F is the frequency band; T is signal duration; and $P_S$ is signal power.

Noise acting on the signal displaces the signal point $x_i$, for example to a position y. Noise is shown by vector "Noise vector", that has length $\sqrt{nP_N}$, where $P_N$—noise power. In accordance with the maximum likelihood rule, the receiver uses information only about the coordinates of the observed point y, which are the result of the sum of two vectors. Note that, in fact, an additive coordinate-wise mixture of two vectors (the signal vector and the noise vector) is observed. But the maximum likelihood rule ignores the possibility of separating these vectors and processes only the result of their sum, y. Having received a point y at the channel output, the receiver, guided by the maximum likelihood rule, searches for the closest to the y point from the list of allowed $X=\{x_1, x_2, \ldots x_m\}$, where m—quantity of different signals. In the example in FIG. 4, the closest point is the signal $x_j \neq x_i$. Therefore, the receiver makes an erroneous decision about the signal $x_j$, instead of true $x_i$. The length of the noise vector depends on the noise power, and the length of the signal vector depends on the signal power. Therefore, the signal-to-noise ratio $P_S/P_N$ becomes the determining parameter of the error probability value. This ratio appears in the capacity formula (1). FIG. 5 illustrates, why the considered maximum likelihood rule leads the modern information theory to the emergence of the so-called fundamental limit of Channel Capacity.

The receiver searches for the closest signal point after observing the channel output. Therefore, these points can be a priori placed so that around each of them it is possible to outline a circle (hypersphere) of a fixed radius so that they do not intersect. The offset of the signal points by noise will not lead them outside the sphere of proximity, if the noise power is not too large. Now we can divide the volume of the "Signal+Noise" spherical space into the volume of one elementary proximity sphere located around the signal point. This allows the determination of the maximum possible number of different signals or the corresponding spheres of proximity $m_{max}$, which can, if n large enough, be transmitted accurately:

$$m_{max} = \frac{\frac{\sqrt{\pi}^n}{\Gamma(n/2+1)}(\sqrt{n(P_S+P_N)})^n}{\frac{\sqrt{\pi}^n}{\Gamma(n/2+1)}(\sqrt{n(P_S)})^n} = \sqrt{\frac{P_S+P_N}{P_S}}^{2FT} = \left(\frac{P_S+P_N}{P_S}\right)^{FT}.$$ Equation (6)

In accordance with Shannon's information measure, for one channel single use T=1, the calculation of the logarithm of (6) leads to the determination of the (1). Thus, the use of only the maximum likelihood rule leads to a fundamental limitation, the capacity of a noisy channel.

The basic idea underlying the system for achieving clean separation of signal and noise is the rejection of the probabilistic method for evaluating noisy signals according to the maximum likelihood rule. Utilizing a separation procedure results in the ratio of the lengths of the "Signal vector" and "Noise vector" becoming completely insignificant. As a result, the signal-to-noise ratio ceases to be decisive for the reliability of communication. Naturally, this eliminates the need to divide the signal space into disjoint spheres and the concept of "capacity" as the limit of achievable rates of an absolutely reliable communication disappears. The opportunity arises in which transmission of information in the same frequency-energy and time resource of the channel is possible, and such transmission can be as much as desired, arbitrarily quickly and arbitrarily reliably The concept of "separation" is fundamentally different from the concept of "filtration". Smoothing linear filtering, as well as the integral equations of the optimal linear filter, are based on solving the probabilistic problem of estimating the signal based on the maximum likelihood rule. Optimal filtering results only minimize the root-mean-square error of signal recovery. Under conditions of small signal-to-noise ratios, the power of this error may approach the power of the signal itself. Optimal filters do not improve the results and do not eliminate capacity limit.

The present system 100 for achieving clean separation of signal and noise utilizes linear algebra to establish the sterile separation of signals. Use of discrete measurements of a mixture of signal and noise enables the composition and solution of ordinary systems of linear algebraic equations (SLAE). The primary tool for such separation is a matrix of coefficients for unknowns of a task. These matrices comprises two parts: the signal part, in which placed sets of discrete measurements of a known basic signal's waveform or waveforms of several signals received simultaneously (taking into account deterministic distortion of the receiving path); and the noise part, which contains the coefficients of the selected basis for the decomposition of noise. The most suitable basis for a number of reasons is the trigonometric basis of the Fourier decomposition. Although, when solving some special problems, it may be more useful to use other bases.

As a result of the solution of a correctly compiled SLAE, a purified form of the value of the informative parameter of the signal, as well as an exact copy of the noise process, is achieved. In this case, another signal or a plurality of signals and noise existing in the same physical resource of the channel may act as noise. Reprocessing using the same algorithm accurately recovers background signals, and the like.

Correctly synthesized matrix of coefficient SLAE is hereinafter termed "Linear Separation Matrix" (LSM). The matrix SLAE is an LSM, if it leads to a correct (according to the Kronecker-Capelli theorem) algebraic system and extracts the true value of the informative parameter of the signal. Moreover, the rank of LSM is equal to the rank of its extended matrix when combined with the column vector of the right-hand side of the SLAE. SLAE based on the correct LSM always has the solution, because its rank coincides with the number of unknown variables. This ensures sterile separation of the signal from noise. The required variables of the task are the informative parameters of the received signals and the coefficients for the basic functions of the noise decomposition in time scale.

One of the basic conditions for obtaining a correct certain system of equations on the basis LSM is the main property of digital data transmission channels. Even with theoretically infinite channel memory (in conditions of a sufficiently limited frequency band), the reaction of the channel's output to the next signal cannot begin earlier than this signal will go to its input.

A primary function of the present system can be described as follows. The receiver observes the channel output for some time before the appearance of the desired signal or after its occurrence, when the next signal may already appear. It is possible to observe not only the operating noise, but also the after effect of the previous discrete signal, which does not hinder correct composition and solution of the reception equations. The presence of a time interval corresponding to the absence of the expected signal makes it possible to obtain the coefficient of LSM with completely linearly independent rows and columns. This provides a sufficiently good system certainty and enables reliable reception of signals even at extremely low signal/noise ratios.

Figure 6:
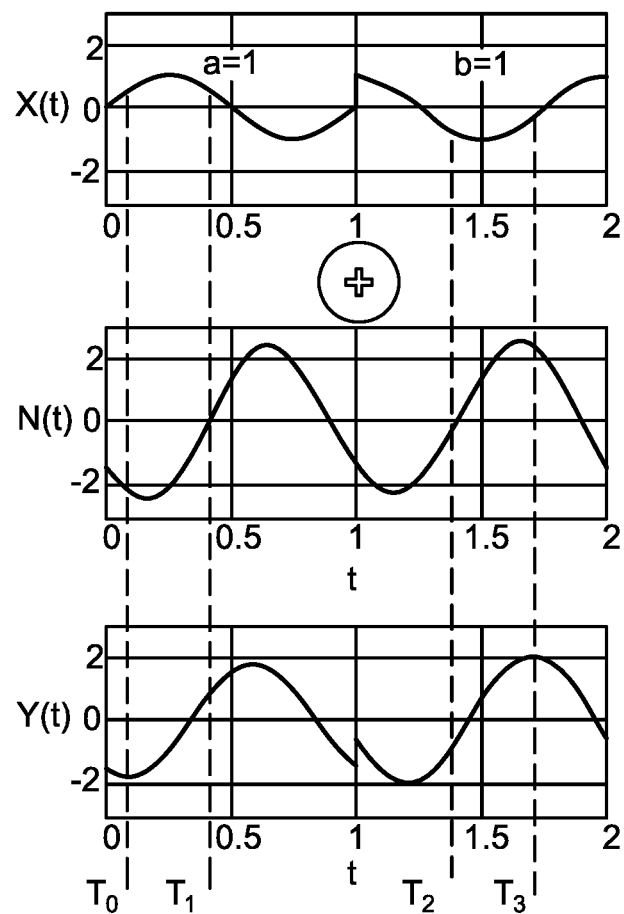
FIG. 6 illustrates a graph illustrating a transmitted signal on the time interval from 0 to 2 seconds and the simplest form of additive noise on the same time interval (2 seconds) using the information transmission system for achieving clean separation of signal and noise of the present invention in accordance with the disclosed architecture.

FIG. 6 illustrates an example of this method where the transmitted signal on the time interval [From 0 to 2 seconds] has the form:

$$X(t) = \begin{cases} a \cdot \sin(2\pi t) & \text{if } 0 \le t < 1; \\ b \cdot \cos(2\pi t) & \text{if } 1 \le t < 2. \end{cases}$$

Where a,b are informative signal parameters, set a=1, b=1.

Suppose that the simplest form of the additive noise on this same time interval (2 seconds) has next view:

$N(t) = -2 \sin(2\pi t) - 1.5 \cos(2\pi t)$.

For simplicity, both the signal and noise of this example are mono-frequency (harmonic functions have the same frequency f=1 Hz) and completely identical in spectrum. The additive mixture is available to the receiver Y(t)=X(t)+N(t).

As illustrated in FIG. 6, assume that the receiver knows exactly the time beginning of the signal existence interval. In this case, for calculation of informative parameters in accordance with the maximum likelihood rule, a conventional receiver calculates a pair of correlation integrals:

$$\tilde{a} = 2\int_0^1 Y(t) \cdot \sin(2\pi t) dt = -1;$$

$$\tilde{b} = 2\int_1^2 Y(t) \cdot \cos(2\pi t)dt = -0.5.$$

Consequently, the following values of the informative parameters are received a=−1, b=−0.5, which leads to error.

To correct this error, the system is configured to carry out mixture Y(t) measurements at specific timings $T_0, \ldots, T_3$, and compose the SLAE: A·x=B, where a coefficient matrix for the unknown variables is:

$$A = \begin{vmatrix} \sin(2\pi T_0) & 0 & \sin(2\pi T_0) & \cos(2\pi T_0) \\ \sin(2\pi T_1) & 0 & \sin(2\pi T_1) & \cos(2\pi T_1) \\ 0 & \cos(2\pi T_2) & \sin(2\pi T_2) & \cos(2\pi T_2) \\ 0 & \cos(2\pi T_3) & \sin(2\pi T_3) & \cos(2\pi T_3) \end{vmatrix} \begin{matrix} \leftarrow \text{for } T_0 \\ \leftarrow \text{for } T_1 \\ \leftarrow \text{for } T_2 \\ \leftarrow \text{for } T_3 \end{matrix}$$

And a vector-column of free members is:

$$B = \begin{vmatrix} Y(T_0) \\ Y(T_1) \\ Y(T_2) \\ Y(T_3) \end{vmatrix} \begin{matrix} \leftarrow \text{for } T_0 \\ \leftarrow \text{for } T_1 \\ \leftarrow \text{for } T_2 \\ \leftarrow \text{for } T_3 \end{matrix}$$

As such, the matrix A is LSM, which is why the obtained SLAE is well defined |A|=−0.951, rank(A)=4 and rank|A||B|=4. We are looking for 4 unknown variables: informative signal parameters a,b and two spectral coefficients of a noise. SLAE has the unique solution:

$$x = \begin{pmatrix} 1 \\ 1 \\ -2 \\ -1.5 \end{pmatrix} \begin{matrix} \leftarrow a \\ \leftarrow b \\ \\ \end{matrix} \} \leftarrow \text{spectral coefficients of noise}$$

Thus, all the amplitude spectral coefficients of the signal were found correctly, those a=$x_0$=1, b=$x_1$=1. Moreover, unmistakably defined noise component. SLAE leads to a correct decision for any ratio of the values of the informative parameters and the spectrum coefficients of the interfering noise. Therefore, the method works at any, arbitrarily small signal-to-noise ratio. The method of uniform distribution of measurements at intervals of adjacent elementary signal components reduces the matrix to the LSM form. After that, all columns of the matrix A became linearly independent.

Figure 7:
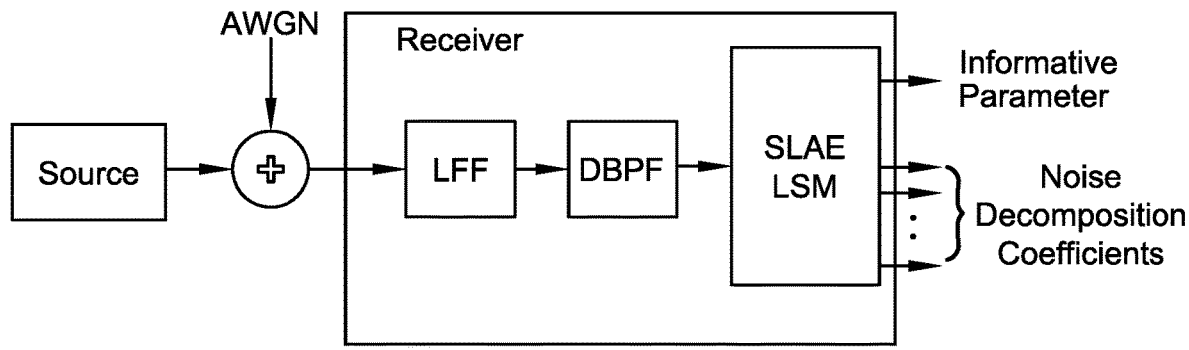
FIG. 7 illustrates an illustrative embodiment of a signal/noise separation scheme for achieving clean separation of signal and noise of the present invention in accordance with the disclosed architecture.

FIG. 7 illustrates a method for a solution for signal and AWGN separation with an unlimited spectrum and an arbitrarily large spectral density of power. The source is a single-pulse source with one of the $2^{16}$ amplitude values from the range [−1 . . . +1]; AWGN is additive white Gaussian noise; LFF is a low frequency filter; DBFP is a digital bandpass filter; and SLAE LSM is an algebraic solver-separator. All transformations in the scheme are linear. The principle of superposition is true. This makes it possible to sequentially consider the signal and noise conversions in the receiver separately. This is possible because the reaction to the sum of the effects for linear devices is equal to the sum of the reactions to these effects, considered separately.

In the gaussian channel, the signal generated by the source is added to noise. The task of the receiver is to recognize one of the $2^{16}$ possible gradations of this amplitude (ranging from −1 to +1) in conditions of signal and noise summation. Out-of-band noise harmonics create a significant barrier to solving the separation problem. The objective of the LFF is to suppress these components.

After out-of-band high-frequency harmonics are suppressed, the mixture of the remaining low-frequency components of a signal and the AWGN is measured at discrete time points over a selected observation interval at a digital bandpass filter (DBFP). In order to take into account the transient process of the effective appearance of the signal response after LFF filtering, this interval is shifted by the selected delay value $d_t$ from the moment of the expected start of the signal arrival.

The duration of the measurement interval is:

$$\Delta = \frac{2 \cdot M}{f_D},$$

where $f_D$ is the sampling rate; (2·M+1) is the SLAE size and, at the same time, the number of measurements performed on a segment (including both its boundaries). At the same time 2·M is the number of sought coefficients for the decomposition of noise realization, and "1" in this case, the number of sought informative signal parameters. The matrix of coefficients for unknown variable of SLAE is formed for a fixed and a limited by value M number of frequency harmonics of the separating process for Nb(t). So, the parameter M can be called the frequency band of the SLAE.

A necessary condition for reducing the SLAE matrix to the LSM form described earlier, is the absence in the Nb(t) residual frequency components with an effective value of amplitudes greater than $\sigma_n \cdot 10^{-15}$. The Butterworth LFF mainly solves this problem, starting with some boundary frequency in the spectrum of the original AWGN. However, a small range remains on the first of the obtained periods, a dangerous frequency range, which is caused by the periodicity of the frequency response of the discrete signal representation. A small range of harmful frequencies penetrates to the input algebraic solver. To suppress AWGN residual harmonics in this dangerous range, the DBPF is included in the circuit. The DBPF has an open structure and has a finite impulse response.

The process of converting a signal-noise mixture by DBPF is described by the expressions:

$$Nbd(t_i) = \sum_{k=0}^{N_{DBPF}} b_k \cdot Nb\left(t_i - \frac{k}{f_D}\right) xbd(t_i) = \sum_{k=0}^{N_{DBPF}} b_k \cdot xb\left(t_i - \frac{k}{f_D}\right).$$

Equations (7)

At the input of "Algebraic solver" in the moment $t_i$ presences the mixture xbd $(t_i)$+Nbd$(t_i)$.

The algebraic solver-separator (SLAE LSM) is designed to separate the signal and noise into two independent processes that occur in time. For this, a system of linear algebraic equations is compiled based on a matrix of coefficients for unknown variables. Such variables are a) the informative parameter(s) of the signal(s); and b) harmonic approximation coefficients of the noise observed in the mixture with the signal.

$$A = \left\| \begin{array}{cccccccc} A_{0,0} & A_{0,1} & A_{0,2} & \ldots & A_{0,M} & A_{0,M+1} & \ldots & A_{0,2M} \\ A_{1,0} & A_{1,1} & A_{1,2} & \ldots & A_{1,M} & A_{1,M+1} & \ldots & A_{1,2M} \\ A_{2,0} & A_{2,1} & A_{2,2} & \ldots & A_{2,M} & A_{2,M+1} & \ldots & A_{2,2M} \\ \ldots & \ldots & \ldots & \ldots & \ldots & \ldots & \ldots & \ldots \\ \ldots & \ldots & \ldots & \ldots & \ldots & \ldots & \ldots & \ldots \\ A_{2M,0} & A_{2M,1} & A_{2M,2} \ldots & \ldots & A_{2M,M} & A_{2M,M+1} \ldots & \ldots & A_{2M,2M} \end{array} \right\|$$

$$2M+1$$

$$2M+1$$

In this matrix, the zero column is filled with the calculated values of the etalon waveform x0(t) (with amplitude a=1) after its transformation by LFF and DBPF. Calculations are performed for moments starting from $d_t$ at the discretization rate $f_D$. The first column is filled with "1" to approximate the noise constant component. Columns with ordering numbers from the range 2÷M filled with cosine quadrature values from the harmonic noise decomposition band, columns from range (M+1)÷2M—sine quadrature values from the same band. All values in these columns are calculated at the same moments as the signal in the zero column.

Free member matrix-column SLAE B filled with measurements of a mixture of signal and noise after its processing in analog and digital filters. Measurements are also taken at the discretization rate $f_D$, starting from $d_t$:

$$B_k = xbd\left(d_t + \frac{k}{f_D}\right) + Nbd\left(d_t + \frac{k}{f_D}\right), k = 0, 1, \ldots, 2M.$$

To implement the separation of signal and noise, the SLAE is solved: A·y=B.

As a rule, even after reduction matrix A to condition LSM, system A·y=B is weakly defined, the number of its conditionality is quite large. Therefore, a more accurate solution is obtained using the standard method based on a LU-decomposition method. In the resulting solution vector y the element $y_0$ is the value of the informative parameter of the signal. In this example, this is one of the $2^{16}$ amplitude levels from the range [−1,+1]. Elements $y_1 \div y_{2M}$—are the coefficients of harmonic approximation of the noise segment in the analysis interval SLAE:

$$Nbd^*(t) = y_1 + \sum_{i=2}^{M} y_i \cos(2\pi(i-1)t) + \sum_{i=M+1}^{2M} y_i \sin(2\pi(i-M)t)$$

Figure 8:
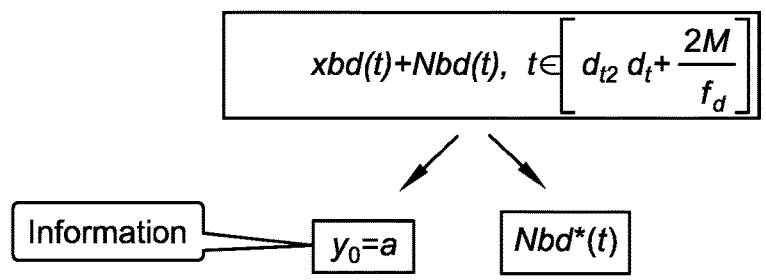
FIG. 8 illustrates an illustrative embodiment of a separating process of the information transmission system for achieving clean separation of signal and noise of the present invention in accordance with the disclosed architecture.

With the correct SLAE and LSM requirements, the quality of the separation process, as illustrated in FIG. 8 does not depend on the signal-to-noise ratio in the channel. The error in extracting of an informative parameter $y_0$=a is negligible and is due only to calculation errors when solving SLAE with matrix sizes (2M+1)×(2M+1).

Reaching the SLAE form satisfying the LSM condition is a solution to the multi-parameter optimization problem. Its presentation in this document would significantly increase its volume. For a given signal form factor (shape and duration) in a Gaussian channel with AWGN with an arbitrarily wide spectrum, the optimization parameters are: a type and basis of the approximating decomposition of the AWGN implementation; a decomposition band when using the harmonic basis of the SALE—M; a frequency of the basic harmonic of the approximating decomposition of noise (or decomposition period); a type of analog frequency selective filter and cutoff frequency $f_c$; DBPF highest and lowest frequency limits $f_L$ and $f_H$, as well as its rank $N_{DBPF}$; value of shift of the measurement interval by the duration of the "stretched" after double filtering the signal $d_t$; duration of the measurement interval; and a way of solution SLAE etc.

Figure 9:
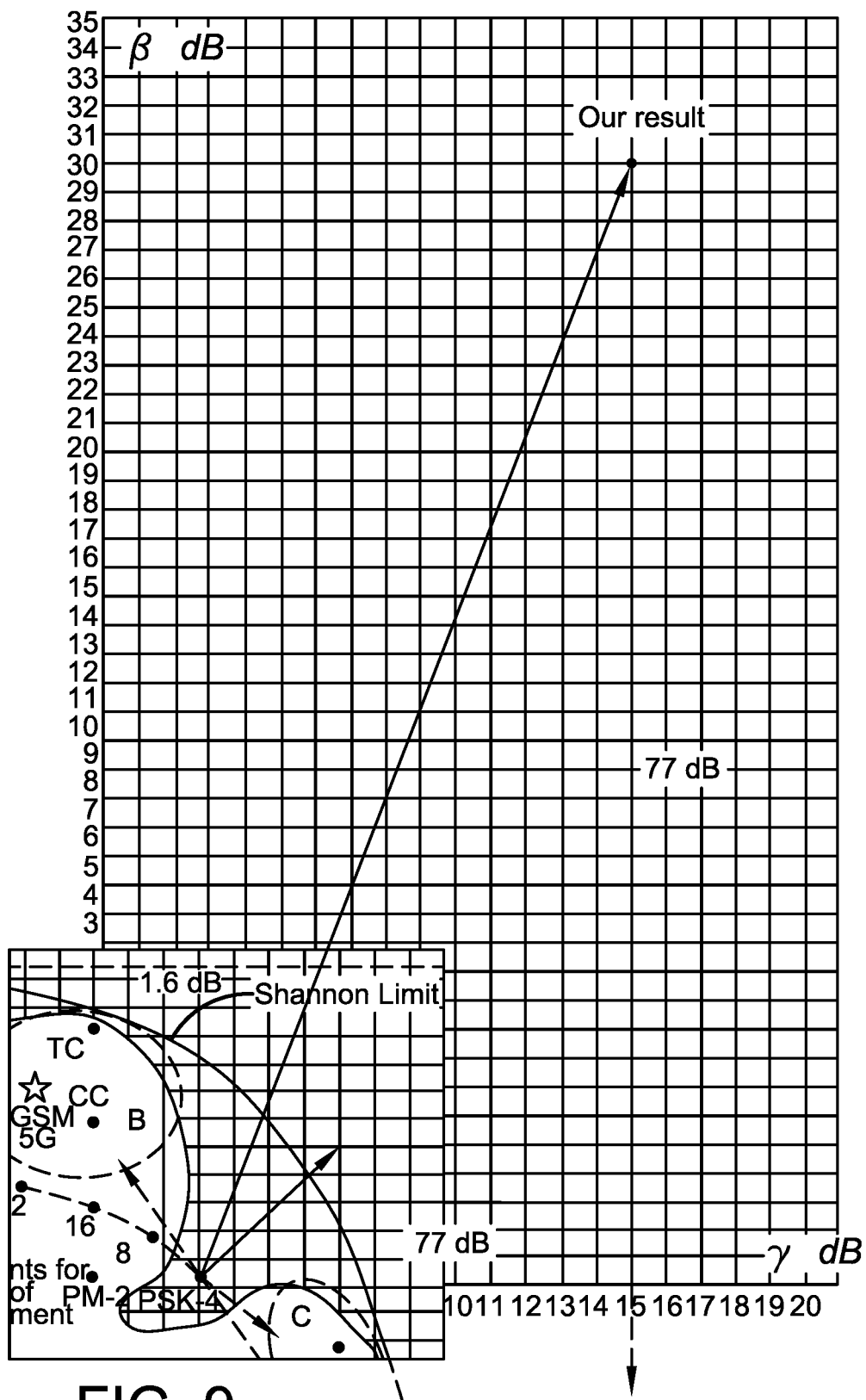
FIG. 9 illustrates a graph illustrating the achieved winnings of utilization of the information transmission system for achieving clean separation of signal and noise of the present invention in accordance with the disclosed architecture.

FIG. 9 illustrates a graphic illustration of achieved benefits in one example of using the system in comparison with existing systems. In the lower left corner of the picture we show a fragment of plan of efficiency from FIG. 3. The display point of our system has coordinates β=30 dB and γ=15 dB. Information transmission system, which was described in our example, is 16 times faster than PSK-4 in the same frequency band, and spends 50,000,000 times less energy to achieve decreasing error probability by 1,000,000 times because the plan in FIG. 3 was built for BER=$10^{-5}$.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for achieving a clean separation of signal and noise comprising:
a frequency preprocessing component;
a solver-separator component in communication with the frequency preprocessing component: and
wherein the frequency preprocessing component is configured to accept a signal to noise mixture from a transmitter/modulator via a channel with noise and send a modified signal to noise mixture to the solver-separator component for completing the clean separation of signal and noise.

2. The system of claim 1, wherein the noise is an interference in a channel or a communication line.

3. The system of claim 2, wherein the channel is a radio channel with global propagation of radio waves.

4. The system of claim 2, wherein the channel is a channel with a guiding medium in the form of a metal conductor or a wave-propagating system.

5. The system of claim 1, wherein a clean signal is communicated to a receiver/demodulator from the solver-separator component.

6. The system of claim 5, wherein the noise is eliminated at an input of the receiver/demodulator before a decision is made.

7. The system of claim 1, wherein the system is configured to monitor a signal source for a plurality of parameters.

8. The system of claim 1, wherein the system is configured to observe an operating noise and an after-effect of a previous discrete signal.

9. The system of claim 1, wherein the system is configured to filter a signal by frequency, shape, duration, or time position.

10. The system of claim 1, wherein the system is configured to suppress out-of-band noise harmonics using a low frequency filter.

11. A system for achieving a clean separation of signal and noise comprising:
- a plurality of radio transmitters;
- a plurality of electronic filters; and
- a plurality of radio receivers configured to receive a clean signal from the plurality of electronic filters; and
- wherein the plurality of electronic filters are configured to use discrete measurements of a mixture of signal and noise to enable a composition and solution of ordinary systems of linear algebraic equations and use a matrix of coefficients for unknowns of a task.

12. The system of claim 11, wherein the matrix comprises a signal part and a noise part.

13. The system of claim 12, wherein the signal part comprises sets of discrete measurements of a known basic signal's waveform or waveforms of a plurality of signals received simultaneously.

14. The system of claim 12, wherein the noise part comprises coefficients of a selected basis for a decomposition of noise.

15. The system of claim 11, wherein the plurality of radio receivers are configured to observe a channel output for some time before an appearance of a desired signal or after its occurrence.

16. The system of claim 11, wherein the plurality of radio receivers are configured to observe an operating noise and an after effect of a previous discrete signal.

17. A method of achieving a clean separation of signal and noise from a source comprising:
- providing an additive white Gaussian noise;
- suppressing any out-of-band additive white Gaussian noise frequency components with a low frequency filter;
- using discrete measurements of a mixture of signal and noise to enable a composition and solution of ordinary systems of linear algebraic equations;
- using a matrix of coefficients for unknowns of a task for achieving a clean separation of signal and noise.

18. The method of claim 17, wherein the source is a single-pulse source.

19. The method of claim 17, wherein the low frequency filter is a maximally flat magnitude filter.

20. The method of claim 19, wherein the low frequency filter is a Butterworth filter.

\* \* \* \* \*